No. 850,806. PATENTED APR. 16, 1907
G. TAYLOR.
HAIRCLOTH LOOM.
APPLICATION FILED AUG. 8, 1904.
9 SHEETS—SHEET 1.
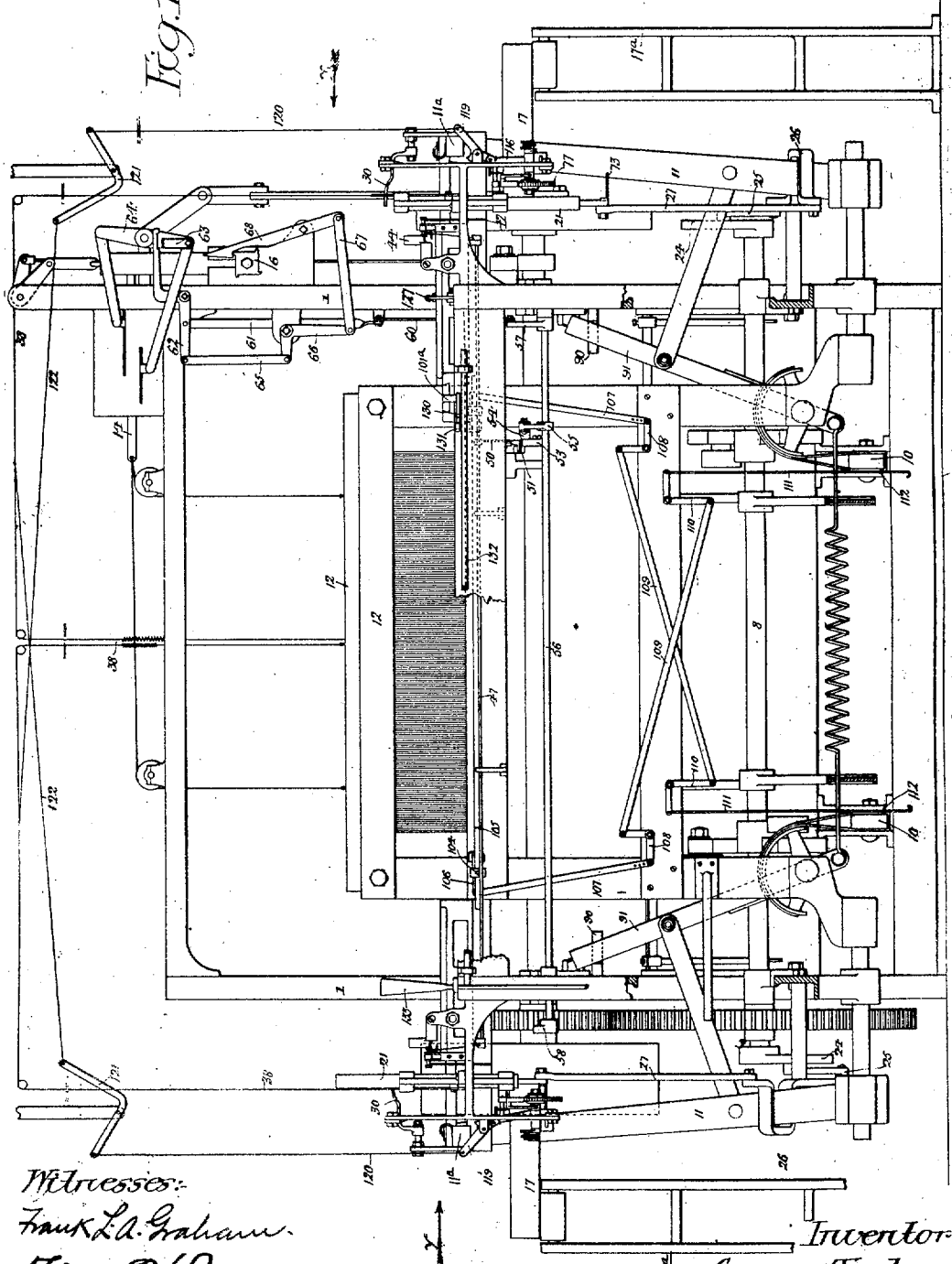

No. 850,806. PATENTED APR. 16, 1907.
G. TAYLOR.
HAIRCLOTH LOOM.
APPLICATION FILED AUG. 8, 1904.
9 SHEETS—SHEET 2.
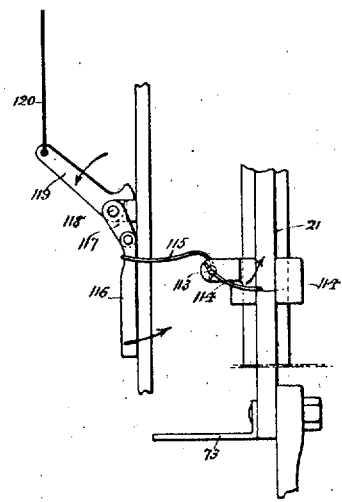
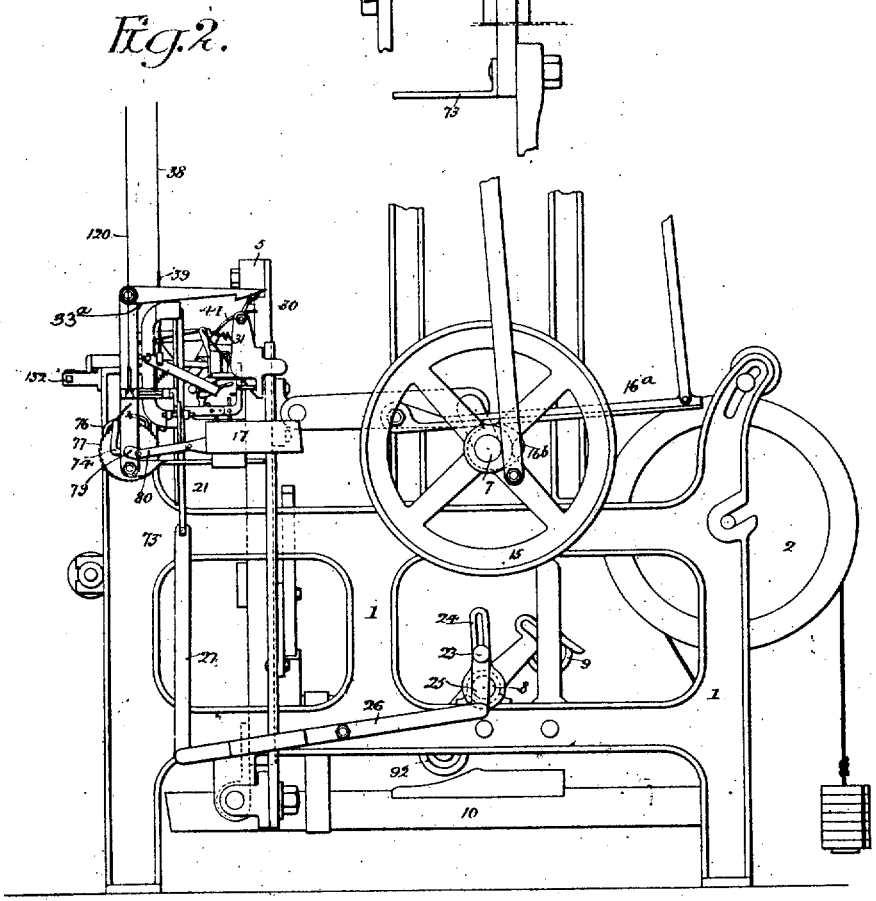
Witnesses:
Frank L. A. Graham.
Titus H. Gross.
Inventor:
George Taylor,
by his Attorneys

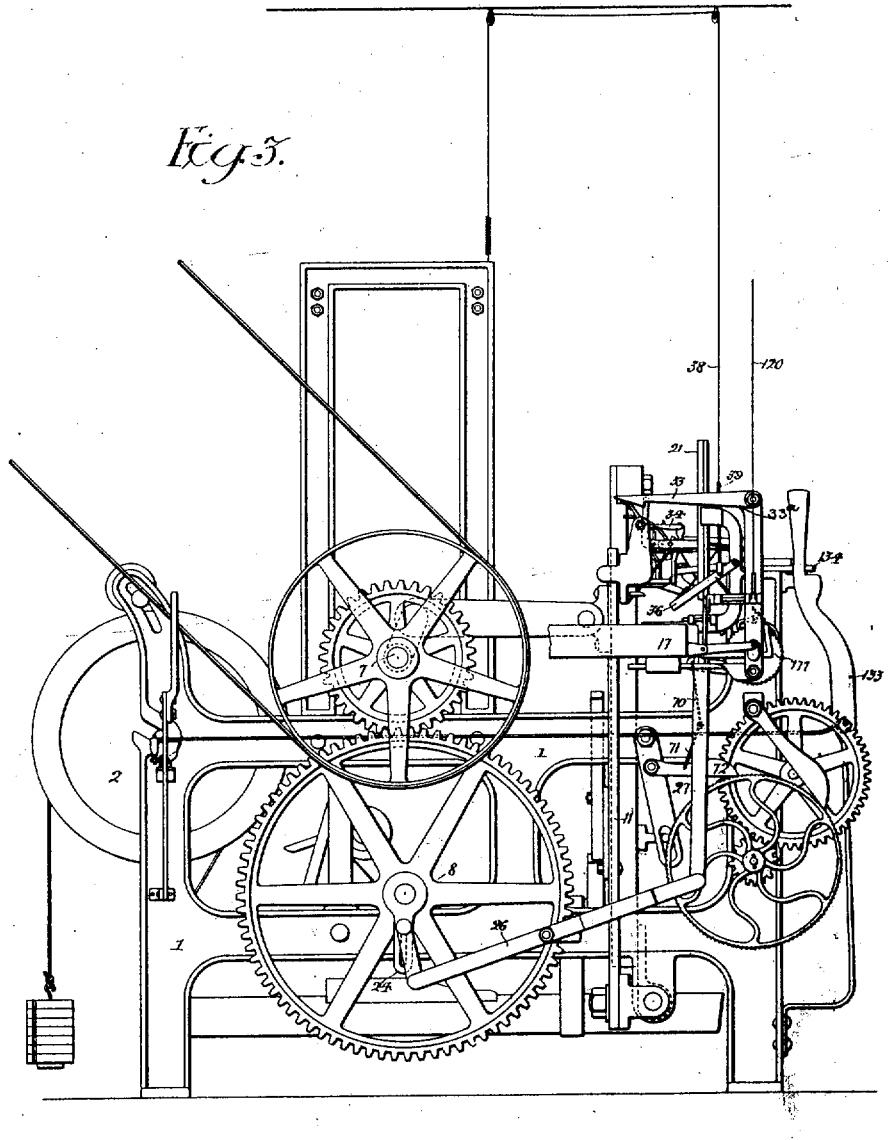

No. 850,806. PATENTED APR. 16, 1907.
G. TAYLOR.
HAIRCLOTH LOOM.
APPLICATION FILED AUG. 8, 1904.

9 SHEETS—SHEET 4.

Witnesses:
Frank L. A. Graham.
Titus H. Frost.

Inventor:
George Taylor,
by his Attorneys,
Howson & Howson

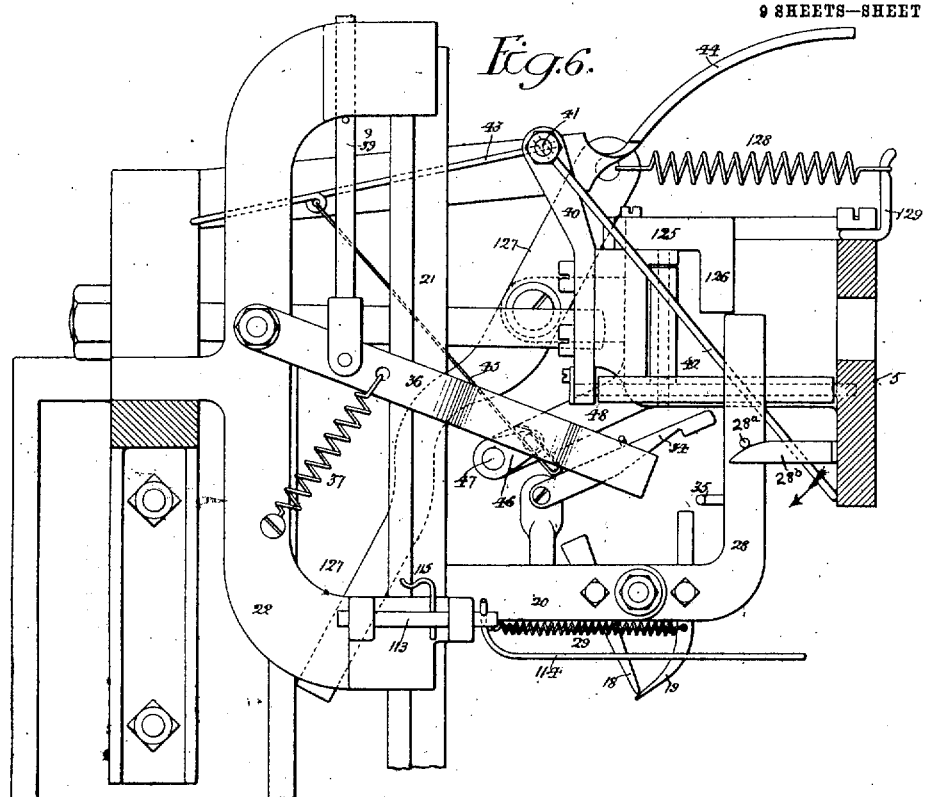
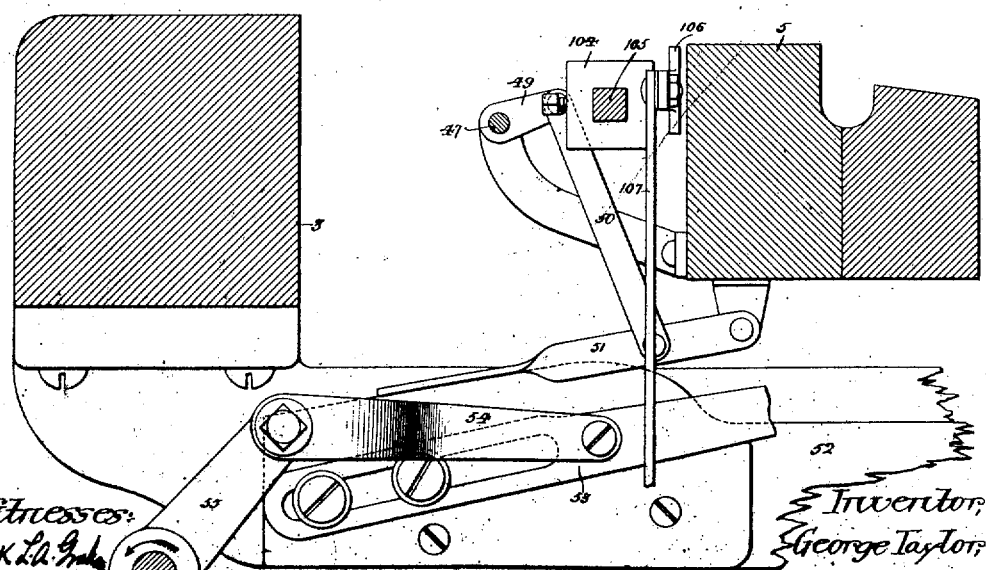

No. 850,806. PATENTED APR. 16, 1907.
G. TAYLOR.
HAIRCLOTH LOOM.
APPLICATION FILED AUG. 8, 1904.
9 SHEETS—SHEET 7.
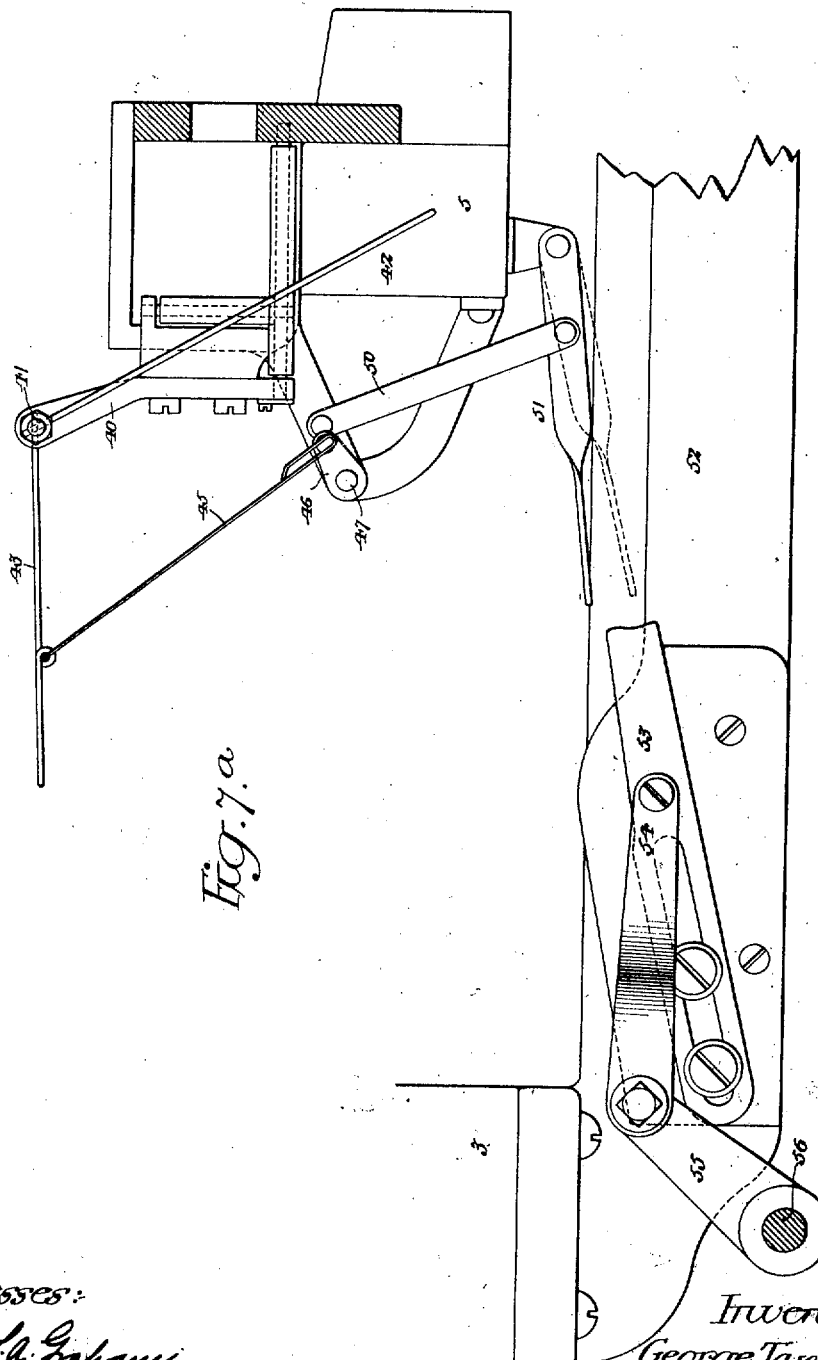
Fig. 7.a
Witnesses:
Frank L. A. Graham.
Titus N. Frows.
Inventor:
George Taylor,
by his Attorneys,
Houson & Hooson

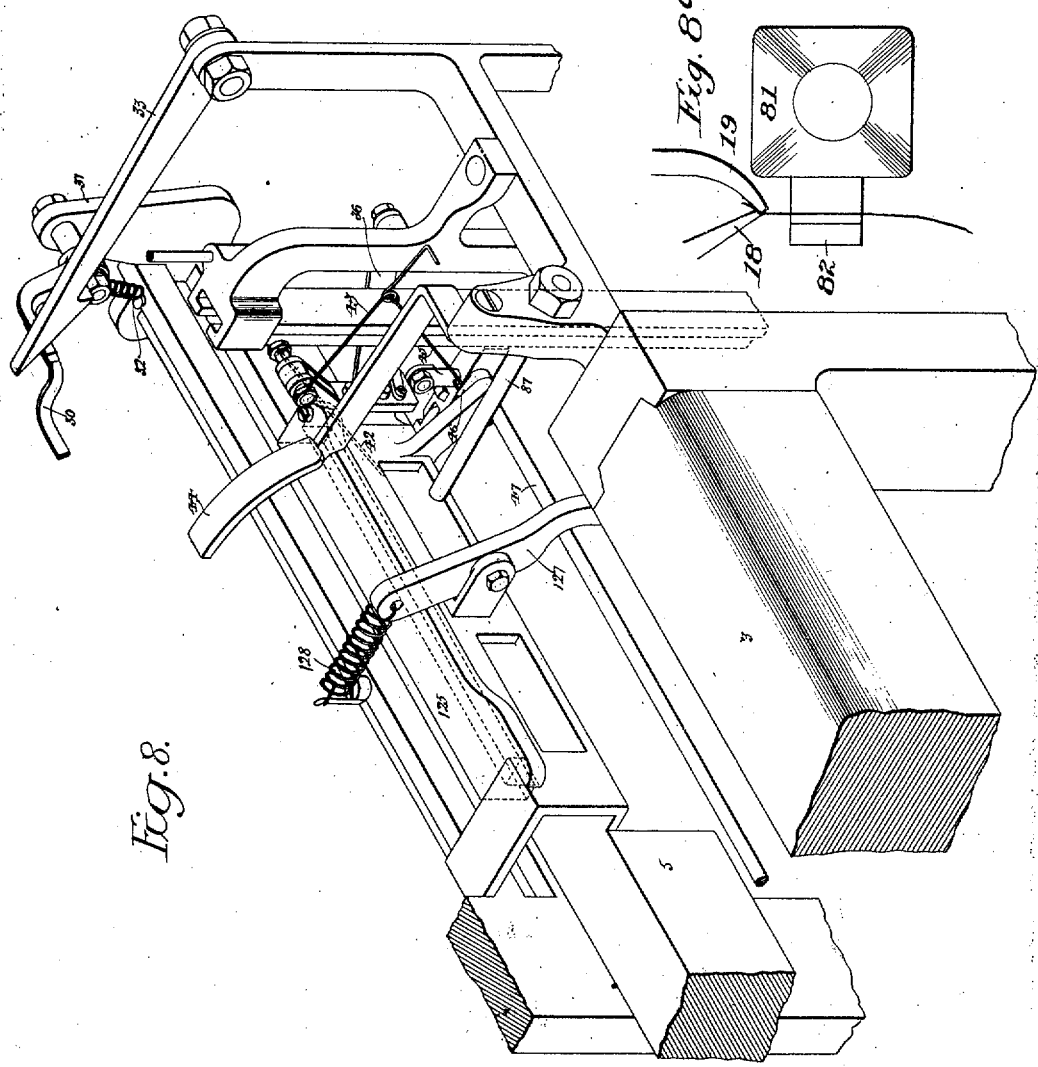

No. 850,806. PATENTED APR. 16, 1907.
G. TAYLOR.
HAIRCLOTH LOOM.
APPLICATION FILED AUG. 8, 1904.
9 SHEETS—SHEET 9.
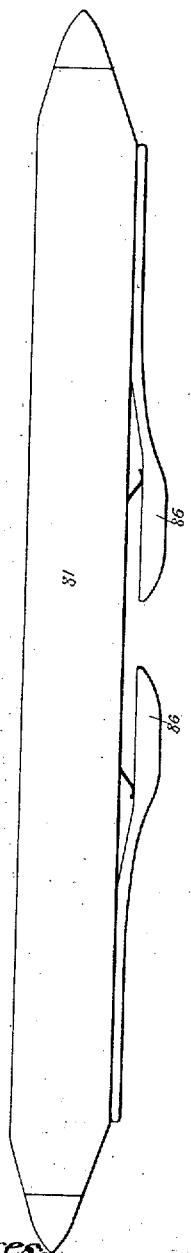
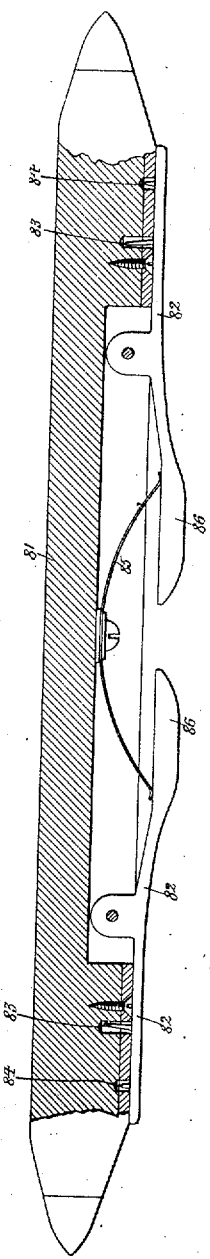
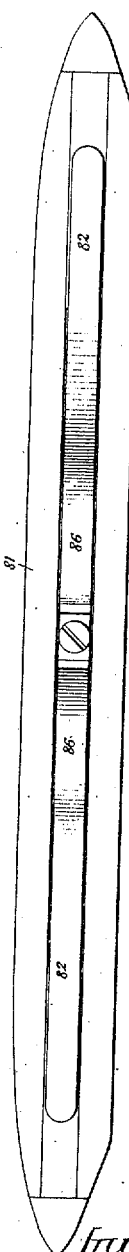
Witnesses:
Frank L. A. Graham
Inventor:
George Taylor,
by his Attorneys,

UNITED STATES PATENT OFFICE.

GEORGE TAYLOR, OF PHILADELPHIA, PENNSYLVANIA.

HAIRCLOTH-LOOM.

No. 850,806.　　　　Specification of Letters Patent.　　　　Patented April 16, 1907.

Application filed August 8, 1904. Serial No. 219,988.

*To all whom it may concern:*

Be it known that I, GEORGE TAYLOR, a subject of the King of Great Britain and Ireland, residing in Philadelphia, Pennsylvania, have invented certain Improvements in Haircloth-Looms, of which the following is a specification.

The objects of my invention are to provide for the production of figured haircloth by using hair of different colors or shades of color in successive picks or shoots to prevent defective weaving caused by failure of the shuttle to engage a hair on each pick, to simplify and improve the hair-selecting mechanism, and generally to improve the construction of the loom with the view of quickening the action of the same and improving the product. These objects I attain in the manner hereinafter set forth, reference being had to the accompanying drawings, in which—

Figures 4, 12:
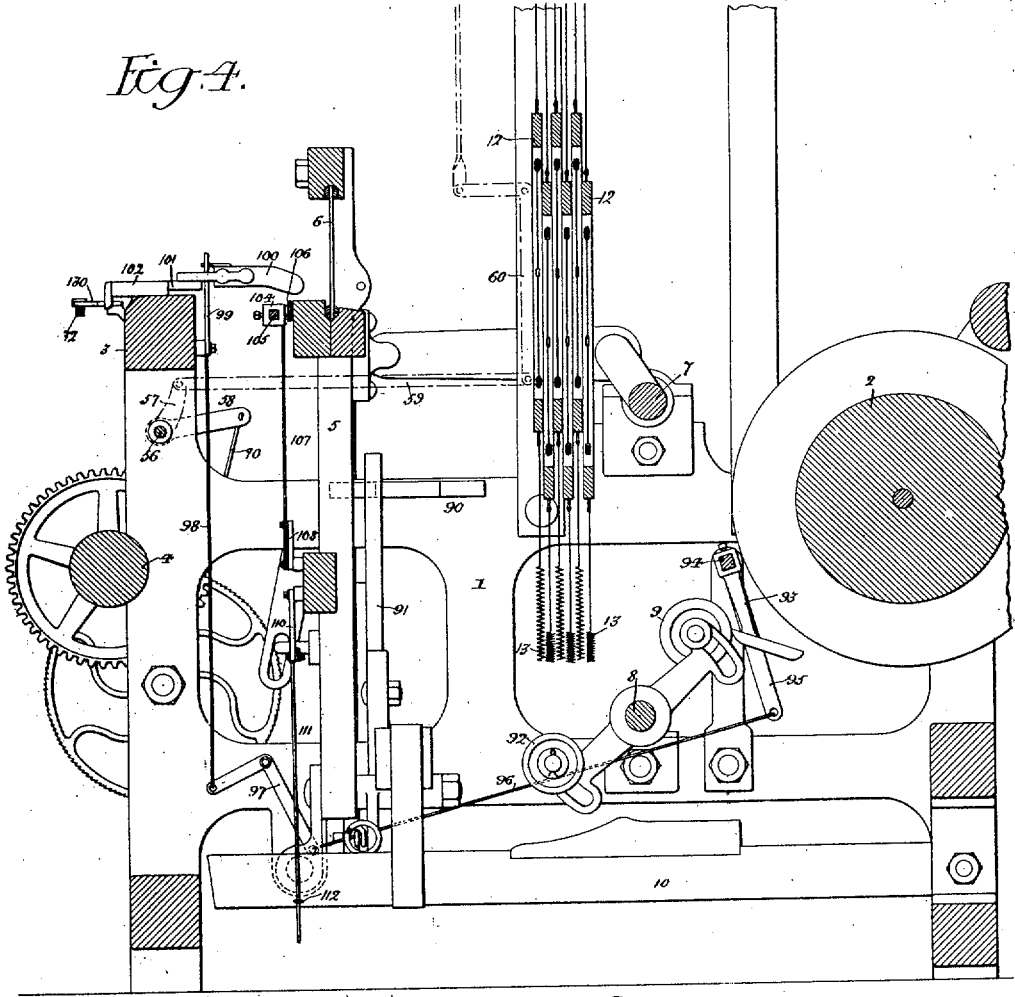
Figure 5:
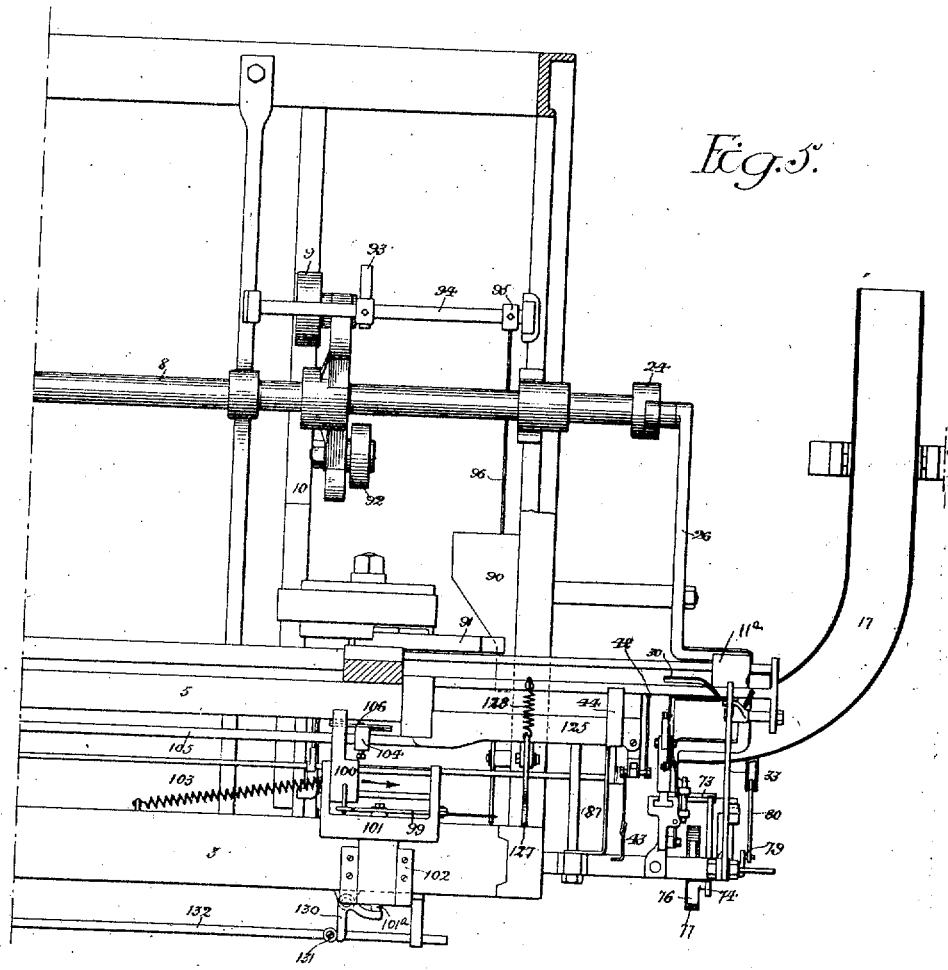
Figure 13:
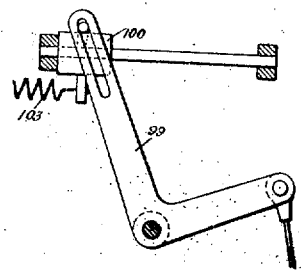

Figure 1 is a front view of a haircloth-loom constructed in accordance with my invention, part of the breast-beam and its appurtenances being broken away in order to illustrate more clearly parts behind the same. Fig. 2 is an end view of part of the loom looking in the direction of the arrow $x$, Fig. 1, but with part of the hair-trough and its support broken away. Fig. 3 is an end view of part of the loom looking in the direction of the arrow $y$, Fig. 1, but also having a part of the hair-trough and its support broken away. Fig. 4 is a longitudinal section of part of the loom. Fig. 5 is a plan view of one end of the loom, partly in section. Fig. 6 is a side elevation, on an enlarged scale, of the hair-selecting devices of the loom and of certain devices for arresting the operation of the heddles when a shuttle misses a pick. Fig. 7 is a view, partly in section and partly in side elevation, of other of said heddle-arresting devices. Fig. 7ª is a view showing the elements of Figs. 6 and 7 in connected relation. Fig. 8 is a perspective view of parts of the loom-frame and lay and devices carried thereby and intended to illustrate more clearly than the general views the construction of such devices. Fig. 8ª is a view showing the relation of the nippers and shuttle at the time that the hair is about to be engaged and held by the clamping devices of the latter. Fig. 9 is a plan view of the shuttle. Fig. 10 is a sectional plan view of the same. Fig. 11 is a front view of the shuttle; and Figs. 12 to 14 are views, on an enlarged scale, illustrating the construction of certain parts of the loom not clearly shown in the general views.

The general weaving mechanism of the loom—that is to say, the means for supplying and shedding the warp-threads, for operating the take-up devices, and for operating the lay and pickers—may be varied in many ways without departing from my invention, since the latter has no reference to this general weaving mechanism, but relates specially to means for selecting the hairs from the hair-pans, delivering them to the shuttle, and releasing them therefrom and for preventing defective weaving due to mispicks. A brief description of the general construction of the loom will, however, be advisable in order to afford a proper understanding of my invention. Hence I will say that 1 1 represent the fixed end frames of the loom; 2, the warp-beam; 3, the breast-beam; 4, the take-up roll; 5, the swinging lay with reed 6; 7, the crank-shaft whereby swinging movement is imparted to the lay, and 8 a shaft driven at one-half the speed of the crank-shaft and having rollers 9, acting upon treadles 10, which are connected in the usual way to the opposite picker-sticks 11, the latter having pickers 11ª, Fig. 5, whereby the shuttle is thrown across the lay from one end of the shuttle-race to the other.

The warp-threads are controlled by heddles 12, which may be shedded by any convenient mechanism, the heddles being in the present instance depressed by means of springs 13 and raised by connection with the reciprocating jacks 14 of a heddle-motion, which is operated by a crank-pin on a wheel 15 on the shaft 7. (See Fig. 2.) The vertically-reciprocating card-cylinder or pattern-drum of said heddle-motion is represented at 16 and receives motion from a lever 16ª, Fig. 2, which is actuated by a cam 16ᵇ on the shaft 7.

The hairs which are to constitute the weft or filling for the fabric are laid longitudinally in curved pans 17, one of which is arranged at each end of the loom, for it should be understood that the latter is of duplex character—that is to say, the shuttle receives a hair at each end of its traverse, so that figured fabric can be produced by using hairs of one color or shade in the pan at one end of the loom and hairs of a different color or shade in the pan at the opposite end of the loom.

The lay of the loom has at each end selecting devices for picking the hairs singly from the troughs 17 and delivering them to the shuttle, the selecting devices at each end of the lay being alike. Hence a description of one of them will suffice. Each selector comprises a pair of nippers 18 and 19, Fig. 6, the nipper 18 being fixedly mounted upon an arm 20, projecting from a slide 21, which is vertically guided in a forked bracket 22, mounted upon the fixed frame of the loom at the end of the breast-beam, vertical reciprocating motion being imparted to this slide 21 from a crank-pin 23, adjustable in a slotted crank 24 on the shaft 8, as shown in Fig. 2, said crank-pin being connected by a link 25 to a lever 26, which is pivoted to the side frame 1 of the loom and is connected by a link 27 to the lower end of the slide 21. The other nipper 19 is mounted upon a swinging arm 28, pivotally mounted upon the inner end of the arm 20, the nippers being normally held in contact with one another by the action of a coiled spring 29, connected at one end to the arm 20 and at the other end to the nipper 19, as shown in Fig. 6, proper relation of the gripping ends of the nippers to each other when said nippers are closed being determined by contact of a stop-pin 28$^a$ on the arm 28 with a fixed finger 28$^b$ on the lay. When the slide 21 is raised, however, the upper end of the arm 28 comes into the path of a bent arm 30, pivotally mounted upon a bracket 31 at the end of the lay, as shown in Fig. 8, and normally held in the retracted position shown in Fig. 2 by the pull of a coiled spring 32, as shown in Fig. 8. When the lay swings forward, however, the inwardly-bent end of the arm 30 is engaged by a hook 33, which is hung to a part of the fixed frame of the loom, as shown in Figs. 2 and 8, normally supported in a horizontal position, as by contact with a pin 33$^a$, Figs. 2 and 2, so that on the next backward swing of the lay the bent end of the arm 30 will be caught by said hook and retained thereby. Hence as the arm 28, which carries the nipper 19, swings backwardly with the lay said arm will come in contact with the arm 30, and as the latter is retained by the hook 33 and cannot move backwardly with the lay it presses upon the upper end of the arm 28, with the effect of swinging said arm 28 on its pivot and separating the ends of the nippers 18 and 19, so as to release the hair which has been clamped between them. As the lay continues its swing the arm 30 turns on its pivot-pin and its engaging end swings downward, so as to be drawn from under the hook 33, and resumes its normal position preparatory to again engaging the hook on the next forward beat of the lay.

The nipper 19 is retained in the open position by engagement of a notched trigger 34 with a hook 35 on the arm 28, so that when the nippers again descend into the mass of hairs in the pan 17 the ends of the nippers will be separated, and when the trigger 34 is lifted so as to release the hook 35 the nipper 19 will by the action of the spring 29 be pulled toward the nipper 18, so as to again grasp a hair between them.

The tripping of the trigger 34 is effected by a swinging arm 36, which is connected to one of the heddle-frames 12, the descent of the latter in forming the shed of warp-threads causing the lifting of the arm 36 and the tripping of the trigger, the descent of the arm 36 on the rise of the heddle-frame being effected by means of a coiled spring 37, connected at one end to the arm 36 and at the other end to the bracket 22, as shown in Fig. 6. Any suitable connection between the heddle-frame and the arm 36 may be provided, the connection which I employ in the present instance being shown in Figs. 1 and 3 and comprising a cord or wire 38, passing over suitable guide-pulleys and connected at one end to the appropriate heddle-frame 12 and at the other end to a bar 39, guided in the bracket 22 and having pivotal connection at its lower end with the arm 36, as shown in Fig. 6.

If the nippers fail to grasp a hair and deliver the same to the shuttle, thus causing a mispick, it is necessary to stop the operation of the pattern mechanism of the heddle-motion, so that there will not be any change in the shed of warp-threads, as that would necessitate a turning back of the loom to restore the shed as it existed when the mispick occurred. The means which I employ for effecting such stoppage are shown in Figs. 1, 2, 5, 6, 7, and 8 and are as follows:

Mounted upon a bracket 40 on the lay is a rock-shaft 41, from which project two wires 42 and 43, the wire 42 occupying such position in respect to the shuttle-box of the lay that when the shuttle enters said box the wire will be moved by contact with the lower front corner of the shuttle in the direction of the arrow, Fig. 6, so as to lift the outer bent end of the wire 43 into the path of a cam 44, mounted on the fixed frame of the loom, and if as the shuttle is shot across the shuttle-race it draws a hair into the open shed of warps this hair will maintain the wire 42 in the position to which it has been moved, as shown in Fig. 7$^a$, and the bent end of the wire 43 will therefore be lifted by the cam 44 when the lay swings backward; but if no hair is drawn into the open shed of warps by the shuttle the wire 42 will as soon as the shuttle leaves the box drop to the position shown in Fig. 6, and the bent end of the wire 43 will not come under the influence of the cam 44.

The wire 43 has a connection 45 with an arm 46 on a rock-shaft 47, mounted in brackets 48 on the lay, and said rock-shaft 47 has another arm 49, which is connected by a link 50 to a trigger 51, hung on the under side of the lay, as shown in Fig. 7.

Guided so as to slide on a fixed bar 52 beneath the lay is a bar 53, which is connected by a bent link 54 to an arm 55 on a rock-shaft 56, mounted in suitable hangers beneath the breast-beam 3, and when the lay is fully retracted the end of the trigger 51 will when the wire 42 is in the position shown in Fig. 6 drop into such position as to engage with the inner end of the bar 53, as shown by dotted lines in Fig. 7ª, so that on the next forward movement of the lay said bar will be pushed forward by engagement with the trigger and the shaft 56 will be rocked in the direction of the arrow, Fig. 7. If, however, the wire 42 is held outward by engagement with the hair which is being drawn into the shed of warps, as shown in Fig. 7ª, the trigger 51 will be held in the elevated position shown by full lines in Fig. 7ª and will not engage with the bar 53.

The rock-shaft 56 has upon it, in addition to the arm 55, other arms 57 and 58, (see Figs. 1 and 4,) the arm 57 being connected by a link 59, (shown by dotted lines in Fig. 4,) to a lever 60, which is hung to one of the side frames of the loom and is connected by a link 61 to another lever 62, one of the arms of which is notched, as shown in Fig. 1, for engagement with an arm 63 on the rocker 64, which actuates the bars whereby the heddle-controlling jacks 14 are moved, thereby temporarily locking these parts together, so as to prevent accidental movement of either of the same at this time. The lever 62 is connected by a link 65 to another lever 66, which in turn is connected by a link 67 to the pivoted hook 68, which engages the toothed disk at the end of the card-cylinder or pattern-drum and insures partial rotation of the same on each reciprocating movement of said drum. Normally the parts are in position shown in Fig. 1, the lever 62 being out of engagement with the arm 63 and the hook 68 being in engagement with the toothed disk of the pattern-drum. If, however, the rock-shaft 56 is rocked in the direction of the arrow, Fig. 7, the lever 62 will be moved so as to engage with the arm 63, and the hook 68 will be moved out of engagement with the toothed disk of the pattern-drum, and the same operation will take place on each forward beat of the lay so long as the shuttle misses a pick.

The arm 58 of the shaft 56 is, as shown in Fig. 3, connected by a wire 70 to an arm 71 on the pawl 72, which operates the ratchet-wheel of the take-up mechanism, and the same motion of the shaft 56 which causes the above-described action upon the heddle mechanism will cause the pawl 72 to be lifted out of engagement with said ratchet-wheel, thereby causing a cessation in the operation of the take-up mechanism. In other words, the loom so far as regards change in the shedding of the warps and the take-up of the woven fabric will come to a standstill whenever the shuttle misses a pick and will remain in this condition until the shuttle again engages a hair and pulls it into the open shed of warps.

In order that all of the hairs in each pan 17 may be brought into the path of the selecting-nippers, it becomes necessary to impart to-and-fro movement to said pans to the extent of the width of the same, and this movement is imparted to each pan from the vertically-reciprocating slide 21 at the corresponding end of the loom, the mechanism being as follows: From the slide 21 projects a finger 73, as shown in Figs. 1 and 12, and on the rise of the slide 21 this finger comes into contact with one arm of a lever 74, which is free to turn on a short shaft 75, mounted so as to be free to turn in a suitable bearing on the fixed structure of the loom, the other arm of said lever 74 being bent upwardly and provided with a pivoted pawl 76, which engages with the teeth of a ratchet-wheel 77, secured to the shaft 75, whereby on each rise of the slide 21 the lever 74 will be struck by the finger 73 and a forward movement of partial rotation will be imparted to the ratchet-wheel 77 and shaft 75, the lever 74 being restored to its normal position after each operation by reason of a spring 78, Figs. 1 to 12, connected at one end to the lever and at the other end to the fixed frame. On the outer end of each shaft 75 is a crank 79, Figs. 2 and 3, having a pin which is connected by a link 80 to the hair-pan 17. Hence as the shaft 75 is rotated intermittently the hair-trough 17 will be moved back and forth upon its supports 17ª by a corresponding series of intermittent movements.

The shuttle 81 has at each end a clamping-lever 82, with suitable pins 83 and 84 entering recesses in the face of the shuttle, and these levers are normally held in a closed position by the action of a spring 85, contained in a central recess of the shuttle, as shown in Fig. 10. The inner end of each clamping-lever 82 extends outwardly, so as to form a cam 86, as shown in Figs. 9 and 10, and as the shuttle enters its box at either end of the lay this cam formation 86 of the forward clamping-lever of the shuttle comes into contact with a rod 87, projecting inwardly from the fixed structure of the loom at the end of the breast-beam, as shown in Figs. 5 and 8, so as to open the forward end of the clamping-lever for the reception of the hair which has been lifted from the trough 17 by the nippers. If, however, the shuttle is shot violently into the box, as by the action of an ordinary picker, mispicks are likely to occur by reason of the dislodging of the hair from the nippers. Hence I provide for arresting the movement of the shuttle before it has fully entered the box and completing its travel by a relatively slow and easy movement, so as to insure the proper engagement of the clamping devices of the shuttle with the hair which has been lifted by the nippers for this purpose. This object is attained by mechanism best shown in Figs. 1, 4, 5, and 13, which mechanism is the same for each shuttle-box and is as follows: On each side frame of the loom is a cam 90, which when the lay is in its fully-retracted position so acts upon the arm 91, which is connected to the picker-stick of the corresponding shuttle-box, as to draw the picker some distance inwardly from the outer end of said shuttle-box, so that when the shuttle after being shot across the lay enters the shuttle-box it will be arrested by the picker before it reaches the outer end of the box and before the clamping devices at the forward end of the shuttle are in position to engage the hair raised by the selecting-nippers.

The same shaft 8, which operates the picker-treadles 10, has arms with rollers 92, adapted to act upon arms 93 on a rock-shaft 94, which is mounted in suitable bearings on the fixed frame of the loom, each rock-shaft 94 having another arm 95, which is connected by a cord or wire 96 to a lever 97, having like connection 98 with a lever 99, mounted on the side of the breast-beam 3, said lever 99 having slot-and-pin connection, as shown in Fig. 13, with a supplementary shuttle-pusher 100, which is guided so as to move longitudinally on the forked inner end of a slide 101, Fig. 5, the latter being mounted so as to be moved back and forth in guides 102 on the breast-beam 3 of the loom.

The supplementary pusher 100 is normally retracted to the position shown in Fig. 5 by means of a coiled spring 103; but it can be moved in the direction of the arrow, Fig. 5, by the action of the roller 92 on the arm 93 when the lay is approaching the limit of its forward movement and will thus engage with the inner end of the shuttle, which has partially entered the shuttle-box and which by the forward movement of the lay has been carried into the path of said supplementary pusher, the latter serving to push said shuttle outward in the box to the full extent, the main picker yielding in advance of the shuttle as the lay swings forwardly, because the arm 91, which is connected to the picker-stick, is free to travel outwardly along the inclined face of the cam 90.

Release of each hair from the clamping devices of the shuttle after said hair has been properly drawn by the shuttle through the open shed of warp-threads is effected by connection with the picking motion at the opposite end of the lay—that is to say, the release of the hair from the shuttle emerging from the right-hand side of the shed is effected by the picking motion at the left-hand end of the lay, and the release of the hair from the shuttle emerging from the left-hand side of the shed is effected by the picking motion at the right-hand end of the lay, such control being effected in the following manner, reference being had only to one set of releasing devices: To a suitable block 104, Figs. 1, 4, and 5, on a transverse bar 105 at the front of the shuttle-race is pivoted a lever 106, which is connected by a link 107 to a bell-crank lever 108, pivoted upon one of the lower cross-bars of the lay, said lever 108 being connected by a link 109 to another bell-crank lever 110, pivoted near the opposite end of said cross-bar, as shown in Fig. 1, said lever 110 having a depending wire 111 hooked at the lower end for engagement with a loop 112 near the front end of the picker-treadle 10. (See Figs. 1 and 4.)

When the forward end of either treadle is depressed, therefore, so as to shoot the shuttle across the lay from one end of the same, the lever 106 at the opposite end of the lay will be operated so that a portion of said lever will be raised into the path of the cam portions 86 of the clamping-levers 82 of the shuttle, and said clamping-levers will therefore be opened and the rear clamp will release the hair which has been pulled by the shuttle through the open shed of warps.

When hairs of different colors or shades of color are being used and it is desired to introduce into the fabric first a hair of one color and then a hair of another color, it is necessary to prevent the selecting-nippers from picking a hair from the left-hand trough if they have missed a hair at the right-hand trough, or vice versa. Otherwise there is a liability that two hairs of the same color will be introduced successively.

If the heddles alone are relied upon for effecting control of the nippers, a couple of picks will be wasted whenever the nippers fail to catch a hair from either pan. For instance, supposing that the right-hand pair of nippers fails to operate, there will be no change in the operation of the heddles on that pick. Consequently the nippers at the opposite side of the loom will also fail to operate, and the empty shuttle will be shot back to the right-hand side of the loom again. If the nippers now grasp a hair and pull it through the shed, the movement of the heddles will not be in proper time to effect the operation of the nippers at the left-hand end of the loom because of the previous mispick, and there will consequently be a mispick at that end. In order, therefore, to insure proper operation of the nippers at either end of the loom whenever a thread is caught by the nippers at the other end of the loom and to supplement the action of the heddles in this respect, I employ the devices shown in Figs. 1, 2, 6, and 14, on reference to which it will be observed that the bracket 22 carries a short rock-shaft 113, from which project two wires 114 and 115, the wire 114 being so disposed that as the nippers rise from the hair-pan a hair caught by said nippers will lift said wire, and consequently cause a downward and inward swinging movement of the outer end of the wire 115. This wire engages with a swinging finger 116, pendent from an arm 117 on a shaft 118, which is mounted on a fixture of the loom and has another arm 119, to which is connected the lower end of a cord or wire 120, the upper end of which is connected to a bell-crank lever 121, mounted on an upper portion of the fixed structure of the loom, as shown in Fig. 1, another cord or wire 122 extending from this bell-crank lever to the connection 38 between the heddle-frame and the trigger-operating rod 39 for the nippers at the opposite end of the loom. Whenever, therefore, a hair is caught by the nippers and lifted into position to be engaged by the shuttle at one end of the loom, the outer end of the wire 115 will be depressed and the lower end of the pendent finger 116 will be swung in the direction of the arrow, Fig. 14, so as to come into the path of the projecting lug 73 on the reciprocating bar 21, and contact of this lug with the finger 116 will cause movement of the lever 119 in the direction of the arrow, Fig. 14, and a consequent pull upon the cord or wire 120 and a lift of the trigger-operating mechanism for the nippers at the opposite end of the loom. This operation will be supplemental to that of the heddles when the latter are working properly and independent of the action of the heddles when their action would be ineffective to cause the proper operation of the nippers.

In order to prevent the shuttle when it enters the shuttle-box at either end of the lay from striking too hard upon the partially-projected picker, I provide a braking device for the shuttle, (best shown in Figs. 6 and 8, on reference to which it will be observed that the front of the shuttle-box has pivoted to it at its outer end a bar 125, which extends throughout almost the entire length of the box and has within the latter a depending vertical flange 126, so disposed that it will be struck and pressed outwardly by the shuttle as the latter enters the box.) The bar 125 is normally pressed inward by means of a lever 127, which is hung to a bracket on the front of the shuttle-box, the upper end of this lever being acted upon by a coiled spring 128, extending from said upper end of the lever to a stud 129, projecting upward from the rear side of the shuttle-box. The flange 126 of the bar 125 thus acts as a friction-brake to arrest the shuttle as it enters the box and prevents the same from striking with undue force the partially-projected picker at the end of the box. As the lay swings forward, however, the lower end of the lever 127 comes into contact with the frame of the loom, as shown in Fig. 6, thereby causing such movement of the lever as will relieve the bar 125 from pressure of the same, and thus prevent the flange 126 from interfering with the pushing of the shuttle to its ultimate outward position in the shuttle-box by the action of the supplementary picker 100.

If the shuttle fails to properly enter the shuttle-box, the loom should be stopped, and such stoppage is effected by mechanism shown in Figs. 1, 3, and 5, on reference to which it will be observed that the outer end of the slide 101, which carries the supplementary picker 100, acts, by means of a toe 101ª, upon a bell-crank lever 130, hung to a bracket on the breast-beam, said lever acting upon an antifriction-roller 131, Fig. 5, on a bar 132, which extends transversely across the breast-beam and is mounted in suitable guides thereon, one end of this bar acting upon the usual knock-off lever 133, so as to release the same from the notched bar 134, which normally retains it, the lever being connected to the power mechanism of the loom in the ordinary way, so that when thrown out of engagement with the notched bar 134 it will release said power mechanism and effect stoppage of the loom.

When both hair-pans are provided with hair of the same color, the connections 38 between the heddles and the selecting devices at the opposite ends of the lay are united, so that the selecting devices at each end of the lay will be operated on each pick of the loom.

Having thus described my invention, I claim and desire to secure by Letters Patent—

1. The combination, in a haircloth-loom, of the hair-pan, the selecting-nippers, a movable carrier therefor, means for opening the nippers, a trigger for retaining them in the open position, and a trip for said trigger, substantially as specified.

2. The combination, in a haircloth-loom, of the hair-pan, the selecting-nippers, a movable carrier therefor, means for opening the nippers, a trigger for retaining them in the open position, a trip for said trigger, and a connection between said trip and the heddle mechanism of the loom, substantially as specified.

3. The combination in a haircloth-loom, of hair-pans, and selecting-nippers at opposite ends of the loom, movable carriers for the nippers, means for opening the nippers, triggers for retaining them in the open position, trips for said triggers, a connection between the same and the heddle mechanism of the loom, and an independent connection for each of said trips operated by the hair which is lifted by the nippers at the opposite end of the loom, substantially as specified.

4. The combination, in a haircloth-loom, of a hair-pan, a pair of hair-selecting nippers, a movable carrier therefor, and an opening device for said nippers consisting of a shaft 130 having an arm thereon and a hook for engaging said arm as the lay swings rearwardly, substantially as specified.

5. The combination, in a haircloth-loom, of a hair-pan, a pair of hair-selecting nippers, a movable carrier therefor, an opening device for said nippers consisting of a shaft having an arm thereon, a hook for engaging said arm as the lay swings rearwardly, and a trigger for retaining the nippers in the open position, substantially as specified.

6. The combination in a haircloth-loom, of a hair-pan, and a pair of selecting-nippers at each end of the loom, movable carriers for said nippers, triggers for retaining the nippers in the open position, trips for said triggers, and connections whereby a hair caught by the nippers at either end of the loom is caused to operate the trigger for the nippers at the opposite end of the loom, each of said connections having as elements a swinging finger movable into and out of engagement with the device which raises and lowers the adjoining nippers, and means whereby said finger is swung into engagement with said device by the lifted hair, substantially as specified.

7. The combination, in a haircloth-loom, of a hair-pan, mounted so as to be movable back and forth, a pair of hair-selecting nippers, means for raising and lowering the same, a shaft having a ratchet-wheel thereon, and also having connection with the hair-pan to move the same back and forth as the shaft is rotated, a pawl engaging the ratchet-wheel and a pawl-carrier acted upon by the device which operates the hair-selecting nippers, substantially as specified.

8. The combination, in a haircloth-loom, of hair-pans and selecting-nippers at opposite ends of the loom, means for raising and lowering the nippers, and means whereby the closing of the nippers at one end of the loom is governed by a hair raised by the nippers at the opposite end of the loom.

9. The combination in a haircloth-loom, of the lay and its shuttle-picking mechanism, a supplementary pusher for moving the shuttle to its full outward position in the shuttle-box, and means for operating said pusher on each forward beat of the lay, the picking member including a member constructed to yield before the shuttle as said pusher moves it outwardly, substantially as specified.

10. The combination in a haircloth-loom, of the swinging lay and its shuttle-picking mechanism, means for arresting the outward movement of the picker before it has reached the end of the shuttle-box, a supplementary pusher for moving the shuttle to the end of the box, and means for operating said pusher on each forward beat of the lay, the picker being constructed to yield in advance of the shuttle as the lay swings forward, substantially as specified.

11. The combination, in a haircloth-loom, of the swinging lay and its shuttle-picking mechanism, means for arresting the outward movement of the picker before it has reached the end of the shuttle-box, and a supplementary pusher for moving the shuttle to the end of the box, the means which arrests the outward movement of the main picker being so disposed that, as the lay swings forward, it will permit such outward movement of the picker, substantially as specified.

12. The combination, in a haircloth-loom, of the swinging lay and its shuttle-picking mechanism, an arm forming part of said shuttle-picking mechanism, a cam for arresting the outward movement of said arm, but permitting such outward movement as the lay swings forward, and a supplementary pusher for pushing the shuttle to the outer end of the shuttle-box, substantially as specified.

13. The combination, in a haircloth-loom, of the swinging lay and its shuttle-picking mechanism, a supplementary pusher for moving the shuttle to the outer end of the shuttle-box, and a shaft having thereon devices for operating both the main picking mechanism and the supplementary pusher, substantially as specified.

14. The combination, in a haircloth-loom, of the swinging lay having shuttle-picking mechanism at each end of the same, a shuttle having clamps thereon, a device at each end of the lay for opening the shuttle-clamps as the shuttle leaves the shed, and mechanism whereby said clamp-opening device at either end of the lay is operated by the picker mechanism at the opposite end of the lay, substantially as specified.

15. The combination, in a haircloth-loom, of the swinging lay having shuttle-picking mechanism at each end of the same, a shuttle having clamps thereon, clamp-releasing devices mounted on the lay and movable into and out of range of the clamps on the shuttle, and an intermediate system of levers, links and wires also mounted upon the lay and serving as a means whereby the picker-operating treadle at either end of the lay is caused to operate the clamp-releasing lever at the opposite end of the lay, substantially as specified.

16. The combination, in a haircloth-loom, of the swinging lay and its shuttle-picking mechanism, the knock-off lever, a supplementary pusher for moving the shuttle to the outer end of the shuttle-box, said supplementary pusher being mounted upon a sliding carrier, and a connection between said sliding carrier and the knock-off lever, whereby the stoppage of the loom is effected when the shuttle fails to properly enter the shuttle-box, substantially as specified.

17. The combination in a haircloth-loom, of the swinging lay and its shuttle-picking mechanism, the hair-selecting devices, the shuttle having hair-engaging clamps thereon, and a contact device for engaging and opening said clamps as the lay swings forwardly; substantially as specified.

18. The combination, in a haircloth-loom, of hair-pans and selecting-nippers at opposite ends of the loom, means for raising and lowering the nippers, and means whereby the closing of the nippers at either end of the loom is controlled by the heddle mechanism of the loom and also by a lifted hair at the opposite end of the loom from that at which the controlled nipper is located.

In testimony whereof I have signed my name to this specification in the presence of two subscribing witnesses.

GEORGE TAYLOR

Witnesses:
WILLIAM F. BEATON,
WALTER CHISM.